J. Britton. Sheet Metal Tea Pot Knob.

No. 119,739.  Patented Oct. 10, 1871.

Witnesses:
P. C. Dieterich.
Wm. H. C. Smith.

Inventor:
J. Britton.
Per Munn & Co.
Attorneys.

119,739

UNITED STATES PATENT OFFICE.

JAMES BRITTON, OF WILLIAMSBURGH, NEW YORK.

IMPROVEMENT IN SHEET-METAL KNOBS FOR TEA-POTS.

Specification forming part of Letters Patent No. 119,739, dated October 10, 1871.

*To all whom it may concern:*

Be it known that I, JAMES BRITTON, of Williamsburgh, in the county of Kings and State of New York, have invented a new and Improved Sheet-Metal Tea-Pot Knob; and I do hereby declare that the following is a full, clear, and exact description thereof, which will enable others skilled in the art to make and use the same, reference being had to the accompanying drawing forming part of this specification, in which—

Figure 1:
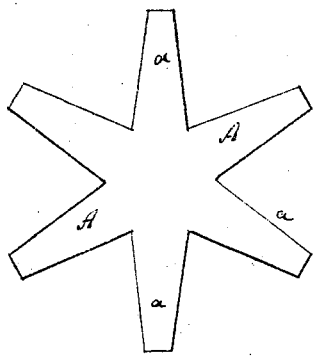
Figure 2:
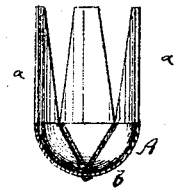
Figure 3:
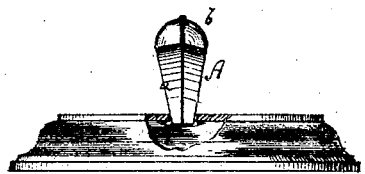
Figure 4:
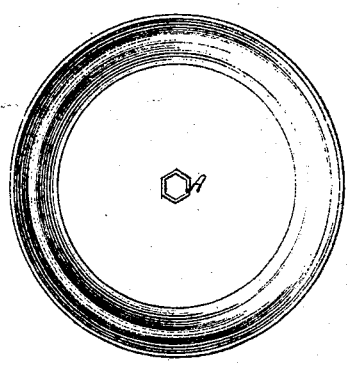

Figure 1 represents a face view of the piece of sheet metal from which my improved knob is formed. Fig. 2 is a central section of the same, showing its arms bent up. Fig. 3 is a side view of my improved knob, showing it secured in the cover of the pot. Fig. 4 is an inverted plan view of the same.

Similar letters of reference indicate corresponding parts.

This invention has for its object to make sheet-metal knobs for tea-pots and similar goods of single pieces, so that they can be made at a less price and quicker than the sheet-metal knobs now in use. Sheet-metal knobs for tea-pots are at present usually made in two pieces of equal size and shape, each piece being first cut and then struck into proper form, the two then being united by lap-joint and solder. The manufacture of such knobs involves five distinct operations, the last of which is difficult and tedious. The appearance of the finished knob is never perfect, as the joint is always more or less visible. My invention consists in forming the knob from one single star-shaped piece of metal by bending the arms of the same and striking up the center, so that the edges of the arms will come in contact with each other.

A in Fig. 1 represents a star-shaped piece of sheet metal, having a suitable number of projecting arms *a a*, and cut of requisite size. Pieces of this form are first cut out by proper apparatus so that a knob may be made of each. The center of the star A is first struck up by punch and die to constitute the ornamental head *b* of the knob, and the arms *a* are bent by the same means, so that the article will have the appearance represented in Fig. 2. The arms are next brought together so that their edges will touch. This is preferably performed by crowding the arms into a conical aperture, whereby they are made to approach to contact. The knob has now the appearance shown in Fig. 3. The contiguous edges of the arms can be soldered together. The knob is secured in place in suitable manner.

By the means above described a knob is made by but three manipulations, to wit, those of cutting, striking up, and final bending of arms. If the arms are to be curved transversely to make the knob of conical instead of pyramidal form they can be so made by striking them in the desired manner at the beginning of the operation.

Having thus described my invention, I claim as new and desire to secure by Letters Patent—

The method of forming a tea-pot knob, A *a b*, by first striking up the center of a star-shaped piece of sheet metal; secondly, bending the head *b* and arms *a* into the shape shown in Fig. 2 of drawing; and thirdly, crowding the arms together in a conical die to produce the form shown in Fig. 3 of drawing, all as specified.

JAMES BRITTON.

Witnesses:
GEO. W. MABEE,
ALEX. F. ROBERTS.